United States Patent [19]
Tepper et al.

[11] Patent Number: 5,290,330
[45] Date of Patent: Mar. 1, 1994

[54] HEPA FILTRATION SYSTEM

[75] Inventors: Byron S. Tepper, Baltimore, Md.; Robert S. Suchomski, Albuquerque, N. Mex.

[73] Assignees: The Johns Hopkins University, Baltimore, Md.; Envirco Corp., Albuquerque, N. Mex.

[21] Appl. No.: 74,334

[22] Filed: Jun. 10, 1993

[51] Int. Cl.⁵ ............................................. B01D 46/52
[52] U.S. Cl. ........................................ 55/276; 55/356; 55/385.2; 55/472; 55/484; 55/498; 55/502; 55/510; 55/DIG. 29
[58] Field of Search ...................... 55/276, 356, 385.2, 55/467, 471, 472, 473, 483, 484, 498, 502, 503, 510, 511, 521, DIG. 29

[56] References Cited

U.S. PATENT DOCUMENTS

| | | | |
|---|---|---|---|
| 4,629,482 | 12/1986 | Davis | 55/471 X |
| 4,810,269 | 3/1989 | Stackhouse et al. | 55/276 X |
| 4,832,717 | 5/1989 | Peters | 55/473 |
| 4,871,380 | 10/1989 | Meyers | 55/498 X |

*Primary Examiner*—Charles Hart
*Attorney, Agent, or Firm*—Cushman, Darby & Cushman

[57] ABSTRACT

A device for filtering air comprising a filter housing having an air inlet for directing flow of air drawn into the housing from atmosphere and an air outlet for directing flow of air exhausted from the housing to atmosphere, the air drawn into the housing carrying air contaminants therewith. A plurality of cylindrical filter stacks having substantially parallel longitudinal axes are disposed in the housing. The filter stacks have outer cylindrical filter walls and inner passages extending therethrough along the longitudinal axes. The filter stacks are capable of filtering the air drawn into the housing by trapping the air contaminants in the filter walls when air is drawn through the filter walls into the inner passages. Finally, a blower is disposed within the filter housing for (1) drawing the air from atmosphere into the filter housing through the air inlet, (2) drawing the air through the filter walls into the inner passages to trap the air contaminants in the filter walls to thereby produce filtered air within the inner passages, and (3) exhausting the filtered air through the air outlet into the atmosphere.

13 Claims, 3 Drawing Sheets

HEPA FILTRATION SYSTEM

BACKGROUND OF THE INVENTION

This invention is generally related to room air purifiers for use in removing air contaminants such as infectious droplet nuclei, bacteria, smoke, pollen, and dust from the air and particularly to room air purifier assemblies incorporating portable high-efficiency particulate air (HEPA) filters for use in hospital rooms.

HEPA filters, such as that disclosed in U.S. Pat. No. 4,629,482, offer an advantage over other type of filter media in that the amount of airborne pollutants which can be effectively removed from the air is significantly increased. HEPA filters have been defined as filters capable of removing 99.97 percent of airborne particles of the size of 0.3 microns or larger. The filters are designed to maintain higher flow rates (between approximately 150 to 700 cubic feet per minute) than comparable filters, and it has been found that HEPA filters last for longer periods of time and, therefore, offer cost savings to the consumer.

While HEPA filters have been incorporated in room air purifiers in many environments, such as laboratories, scientific research rooms, and even office buildings, there is a particular need for HEPA filtration of airborne particulates in health-care facilities. Specifically, the risk of acquiring tuberculosis in a health-care environment is a function of a concentration of infectious droplet nuclei. Therefore, in such an environment, it is necessary that a room air purifier create an airflow which will circulate all the air within a room through the filter media as often as possible to insure continuous removal of infectious droplet nuclei. The room air purifiers of the prior art have not effectively dealt with this concern.

Another consideration which has not been satisfactorily addressed is the fact that after prolonged use of such purifiers in the hospital environment, the filter elements may accumulate a significant amount of infectious droplet nuclei and become a source of infectious contamination. The prior art has not provided filter housings which adequately prevent accidental contact with filter element(s) contained therein while also allowing easy replacement of such elements.

Another consideration which has not been satisfactorily dealt with by prior art mobile room air purifiers is that they have been made light weight and compact for domestic use and, as such, do not separate the air inlet and air outlet to the extent necessary to provide the air velocity and circulation patterns required for the rapid capture of particulates, including pathogenic microorganisms which are generated by a patient.

Another consideration which has not been appreciated by prior art room air purifiers is the need to make the units as quiet as possible. Many, if not all, of HEPA filter room air purifiers utilize blowers or fans which are noisy during operation. This can be quite irritating to health-care patients who are in need of rest.

SUMMARY OF THE INVENTION

It is an object of the present invention to fulfill the needs expressed above in an efficient and inexpensive manner. In accordance with the principles of the present invention, this objective is achieved by providing a device for filtering air comprising a filter housing having an air inlet for directing flow of air drawn into the housing from atmosphere and an air outlet for directing flow of air exhausted from the housing to atmosphere, the air drawn into the housing carrying air contaminants therewith. A plurality of cylindrical filter stacks having substantially parallel longitudinal axes are disposed in the housing. The filter stacks have outer cylindrical filter walls and inner passages extending therethrough along the longitudinal axes. The filter stacks are capable of filtering the air drawn into the housing by trapping the air contaminants in the filter walls when air is drawn through the filter walls into the inner passages. Finally, a blower is disposed within the filter housing for (1) drawing the air from atmosphere into the filter housing through the air inlet, (2) drawing the air through the filter walls into the inner passages to trap the air contaminants in the filter walls to thereby produce filtered air within the inner passages, and (3) exhausting the filtered air through the air outlet into the atmosphere.

It is an object of this invention to provide a portable (mobile) air filtration device in which the air inlet (return) and the air outlet (supply) can be separated vertically to provide a ceiling to floor air circulation pattern. Additionally, when the filter unit is properly placed in a hospital room, the air circulation pattern can provide an "air curtain" which will limit the migration or dissemination of airborne particulates out of the containment area.

A further object of the present invention is the provision of a portable or movable air filtration device in which the relationhip of the air inlet (return) and air outlet (supply) in the filter housing may be arranged in several configurations. The normal configuration for general filtration of a room is described above. In another configuration, the air inlet can be located at a height which provides for the immediate capture of particulates either microbial or nebulized medication, at bedside or stretcher height. In a third configuration, the air inlet, in either the low or high position, and the air outlet are on opposite sides of the filter housing, filtering air from one side of the device and discharging clean air on the other side.

It is a further object of the present invention to provide an air filtration device in which the air outlet and air inlet of the filter housing includes movable baffle plates to direct the flow of air to and from the device.

It is a further object of the present invention to provide an air filtration device in which the filter housing comprises a frame and housing panels lined with acoustical damping material.

The invention will be more fully understood by referring to the following detailed specification and claims taken in connection with the following drawings.

IN THE DRAWINGS

DESCRIPTION OF THE PREFERRED EMBODIMENT

Figure 1:
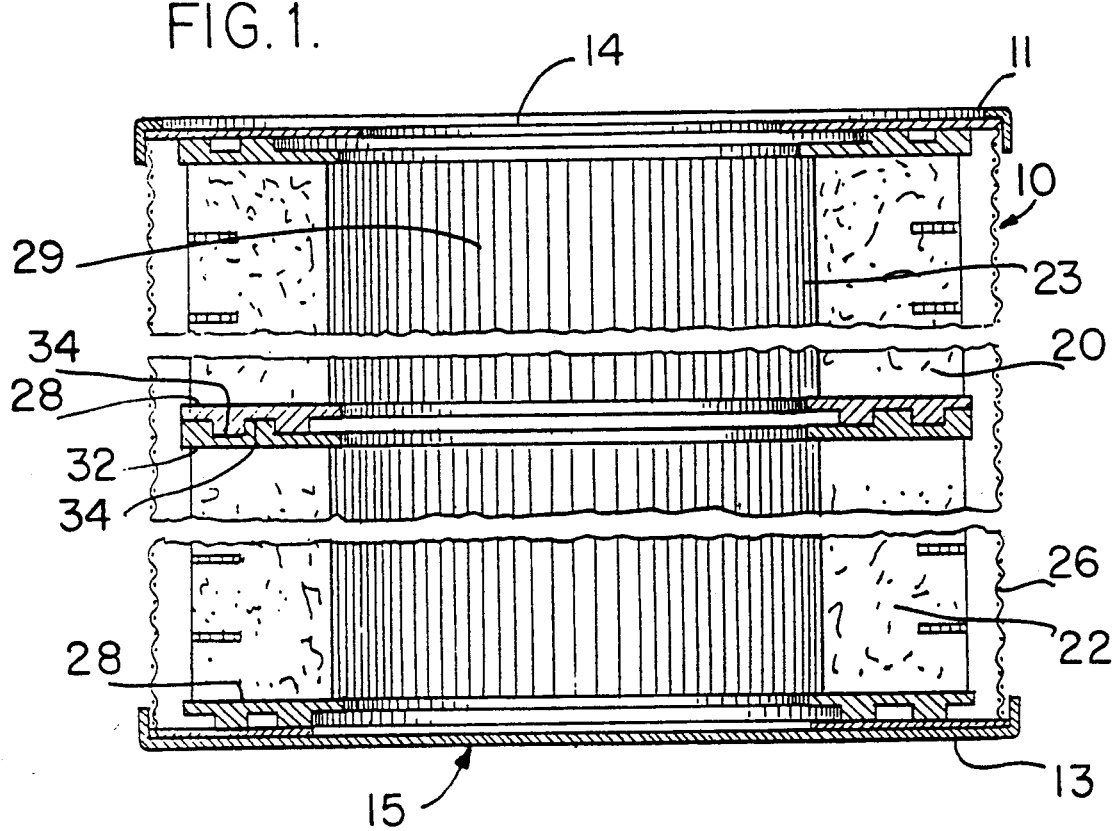
FIG. 1 is a cross-sectional view of a filter stack of the present invention.

With reference to FIG. 1, there is shown a cylindrical filter stack 10 of the present invention. Filter stack 10 is defined by coaxially stacked cylindrical filter elements 20 which extend between removable lid 11 and removable base 13. While a filter stack may be comprised of only one filter element, it is understood that providing additional coaxially stacked filter elements of a given size increases the total filtration surface area and thus the filtration capacity of the stack.

Lid 11 has an opening 14 therethrough while base 13 forms a closed end, generally indicated at 15, of the filter stack 10. Mounted to each filter stack 10 is a peripheral screen 26, and mounted inwardly of the screen is a generally cylindrical filter wall 22 made of HEPA filter material. For support, the filter elements include vertically extending leg members 23.

Within the center of each filter element 20 an inner air passage 29 is provided which receives air after it has passed through filter wall 22. Passage 29 extends from closed end 15 upwardly towards opening 14. When a plurality of filter elements 20 are coaxially stacked, the length of inner air passage 29 is thereby extended and the overall surface area of filter wall 22 is increased.

The filter elements 20 each have lower and upper annular ends or surfaces 28 and 32 respectively, between which cylindrical filter walls 22 are fixed in airtight relation. Surfaces 28 and 32 are formed of a resilient or elastomeric material and include a pair of annular ribs or seals 33 and 34 respectively. Ribs 33 of surfaces 28 interlock to form a seal with ribs 34 of surfaces 32 of adjacent filter elements 20 so that adjacent filter elements are stacked in airtight sealed relation.

Figure 2:
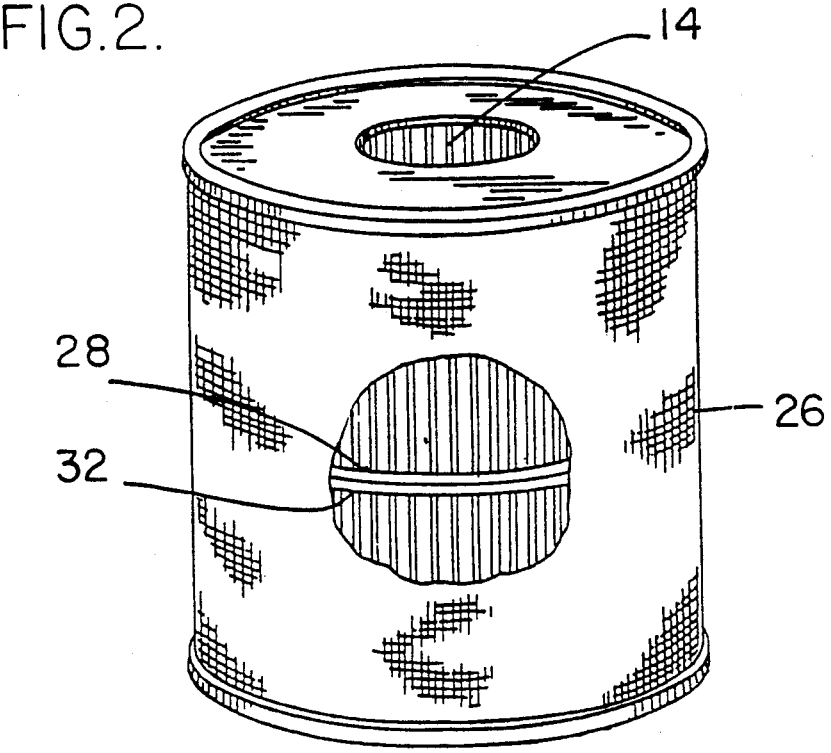
FIG. 2 is a perspective view of a filter stack of the present invention.

FIG. 2 shows a perspective view of two filter elements stacked in coaxial relationship to form a filter stack. Opening 14 is clearly shown in this figure.

Figure 3:
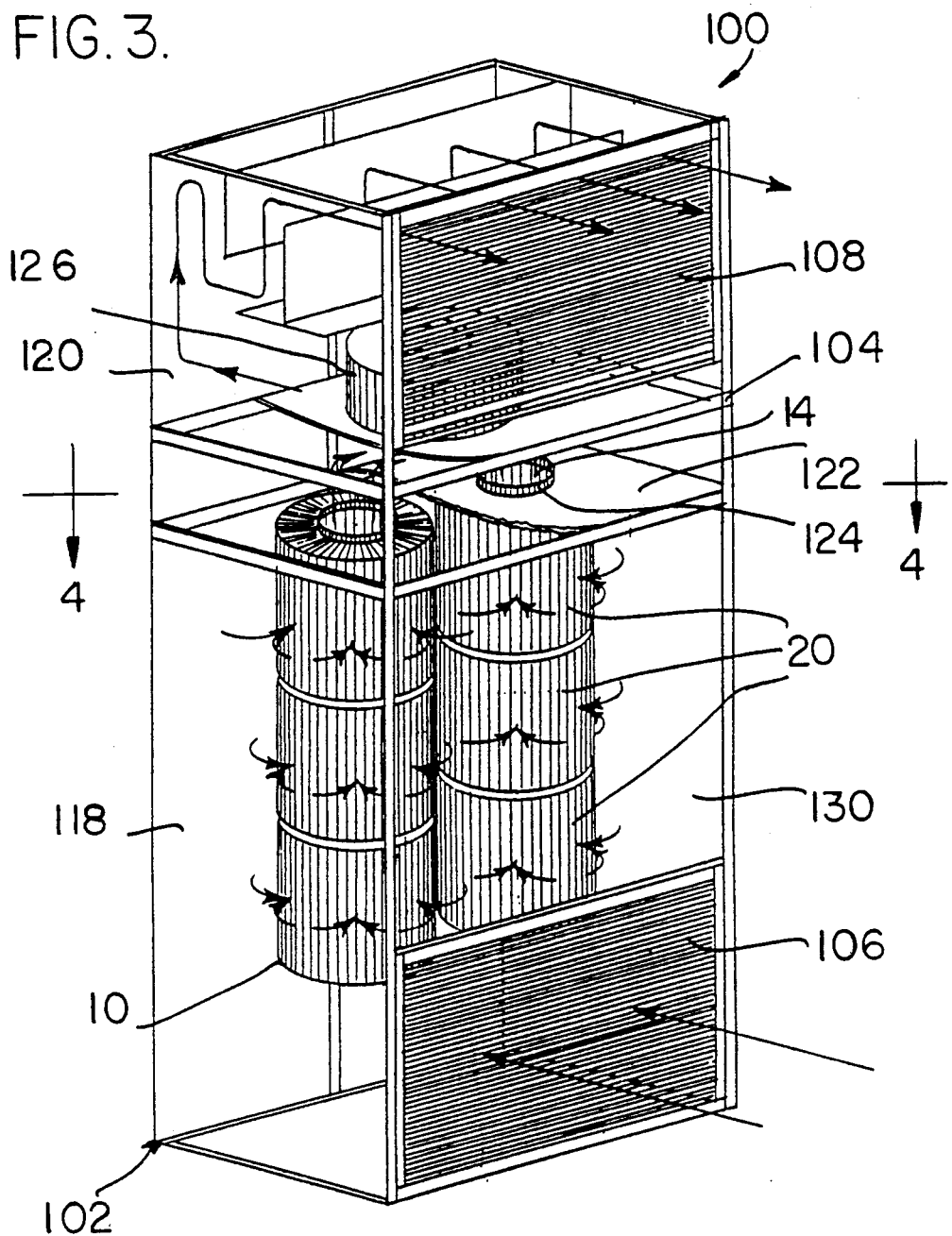
FIG. 3 is a perspective view of the air filtering device of the present invention shown with housing panels removed therefrom.

FIG. 3 shows a complete filter device of the present invention, indicated generally at 100. Filter cabinet or housing 102 is illustrated with its generally rectangular cabinet panels (not shown) removed for the purpose of illustrating the filter stacks 10 disposed within housing 102. It can be appreciated that when the cabinet panels are in place in the corresponding rectangular planes defined by filter housing frame 104, a substantially airtight enclosure is formed with the exception of air inlet 106 and air outlet 108. Air inlet 106 and air outlet 108 contain baffle plates therein for directing the flow of air intake into air inlet 106 and air exhaust through outlet 108.

As described above, the filter stacks 10 have substantially parallel longitudinal axis. By providing cylindrical filter stacks in side-by-side relation as shown, the total filtration capacity of the purifier is effectively increased without resorting to further stacking of filter elements 20 to an inconvenient height for the purpose of filter element replacement. The inner passages 29 extend through each of the cylindrical filter stacks 10 along the longitudinal axes thereof from the closed end 15 at the bottom thereof upwardly towards opening 14 at the upper end thereof.

Figure 4:
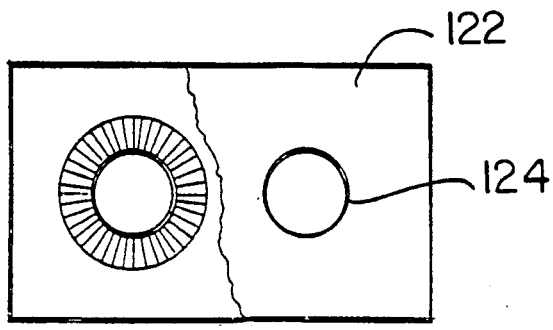
FIG. 4 is a sectional view of the air filtering device of the present invention looking downwardly on the line 4—4 in FIG. 3.

Filter housing 102 is divided into lower air space 118 and upper air space 120 by passage plate 122 (for convenience, passage plate 122 is shown broken away so as to divide only the right-sided portion of housing 102 in FIG. 3). Passage plate 122 is horizontally disposed within filter housing 102 and has its outer periphery attached in airtight relation with housing frame 104. Passage plate 122 is further sealed in airtight relation to lids 11 of filter stacks 10 and has circular bores 124 through which air within lower air space 118 can migrate to upper air space 120 by passing inwardly through the filter walls 22 of filter stacks 10, into the inner passages 29, and up through openings 14. Passage plate 122 is clearly shown, in broken away form, in FIG. 4.

Referring now back to FIG. 3, blower 126 is shown disposed in upper air space 120 of filter housing 102. The blower 126 is capable of exhausting filtered air through air outlet 108 at 400-500 feet per minute. In operation, blower 126 draws air from atmosphere into filter housing 102 through air inlet 106. Air which is then contained within lower air space 118 is drawn through the filter walls 22 of filter stacks 10 into inner passages 29. Contaminants carried by the air drawn into housing 102 are trapped by filter walls 22 and not permitted to enter inner passages 29. The filtered air is drawn upwardly through inner passages 29 and into upper air space 120 through opening 14. Finally, blower 126 exhausts the filtered air through air outlet 108 back into the room's atmosphere.

It will be appreciated that it is possible to place a prefilter within filter housing 102 to substantially cover the area of air inlet 106. Such a prefilter may be used to remove larger particles before the air passes through the HEPA filter stacks 110 in order to preserve the filtration capacity of the latter.

It is also desirable to provide a means (not shown) by which the direction of the baffle plates in air inlet 106 and air outlet 108 can be altered to correspondingly change the direction of air inlet or outlet flow. For example, louver type mounting of the plates extending across each opening may be used.

Figure 5A:
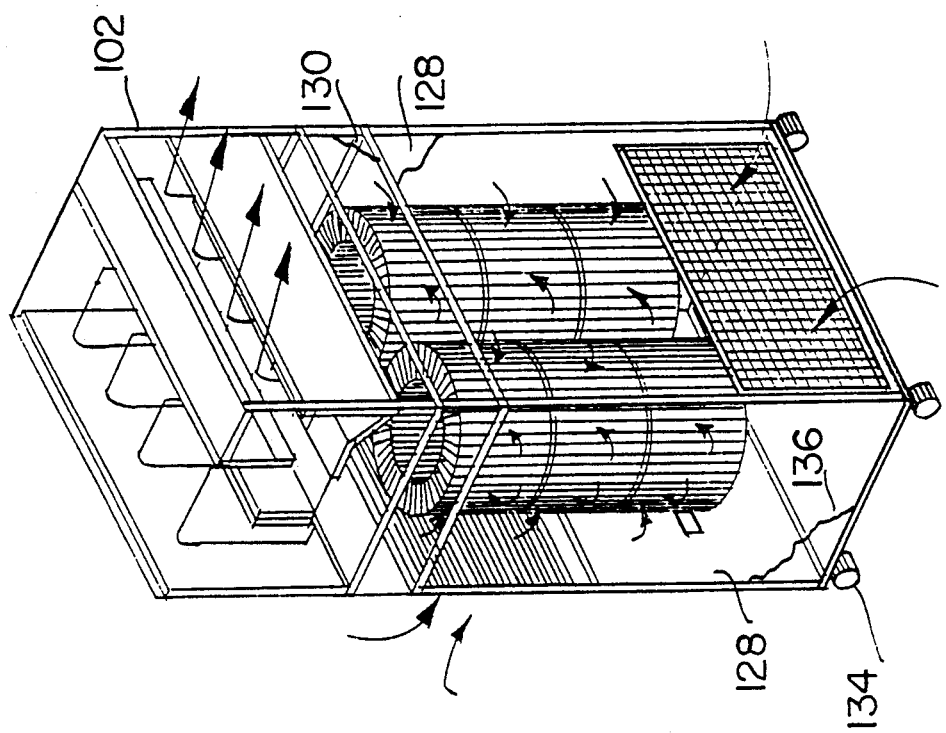
FIGS. 5A and 5B are views of a modification of the invention of FIG. 3 showing a repositionable inlet panel to alter the air flow pattern to suit a particular need.
Figure 5B:
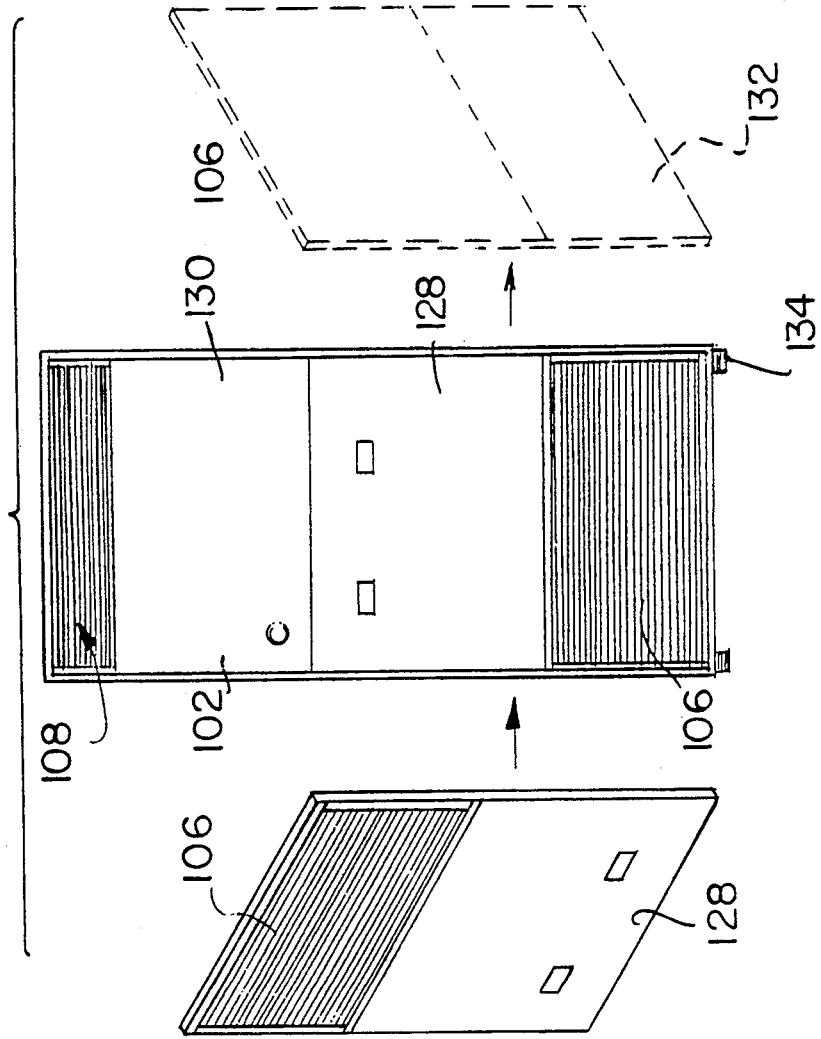

In FIGS. 5A and 5B, modifications of the structure of FIG. 3 are shown where the panel 128 carrying the air inlet 106 is removable and repositionable, as in the FIG. 3 structure, and can be reinstalled in another position to alter the intake air flow to suit a particular application. For example, by simply removing, rotating and reinstalling the panel 128 in its opening on the front wall 130 of the housing 102, the air inlet 106 will be raised from adjacent the base to adjacent the mid-height, corresponding to stretcher height, of the housing 102. similarly, for example, by interchanging panel 128 with an imperforate panel 132 on the opposite side of the housing 102 as shown in FIG. 5B, air inlet flow from the opposite side of the housing can be easily achieved while either maintaining flow through opening 106 on the front of the housing 102 or flow through the front may be cut off by installing the imperforate panel 132 in place of the panel 128. Still other arrangements of the air inlet as well as the air outlet will be apparent to the technician. Also, to facilitate positioning of the housing 102, rollers 134 may be attached to the bottom of the frame.

Finally, it can be appreciated that, when in place, the cabinet panels may be lined with sound insulation material, such as padded foam 136 or the equivalent, so as to minimize the transmission of sound generated by blower 126 into the room.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed with the spirit and scope of the following claims.

The following is claimed:

1. A device for filtering air comprising:

a filter housing having an air inlet for directing flow of air drawn into the housing from atmosphere and an air outlet for directing flow of air exhausted from the housing to atmosphere, the air drawn into the housing carrying air contaminants therewith;

a plurality of cylindrical filter stacks having substantially parallel longitudinal axes disposed in the housing, the filter stacks having outer cylindrical filter walls and inner passages extending therethrough along the longitudinal axes, the filter stacks capable of filtering the air drawn into the housing by trapping the air contaminants in the filter walls when air is drawn through the filter walls into the inner passages; and blower means disposed within the filter housing for (1) drawing the air from atmosphere into the filter housing through the air inlet, (2) drawing the air through the filter walls into the inner passages to trap the air contaminants in the filter walls to thereby produce filtered air within the inner passages, and (3) exhausting the filtered air through the air outlet into the atmosphere.

2. The device as claimed in claim 1 wherein each of said filter stacks are comprised of a plurality of coaxially stacked cylindrical filter elements.

3. The device as claimed in claim 1 wherein the housing is internally divided into upper and lower air spaces by a passage plate having opening means therethrough allowing the air drawn into the housing to pass from the lower air space to the upper air space, the filter stacks being disposed within the lower air space and the blower means being disposed within the upper air space, said filter stacks having an opening to said inner passages at one end thereof, said filter stacks being sealed to the passage plate at said one end in concentrically aligned relation with said opening means so that said inner passages are in unobstructed air communication with the upper air space.

4. The device as claimed in claim 3 wherein said filter stacks have a closed end opposite said one end so that said inner passages are prevented from being in unobstructed air communication with the lower air space, said air being forced to permeate said filter walls in order to pass from said lower air space to said upper air space.

5. The device as claimed in claim 1 wherein the air outlet includes movable baffle plates for altering the directed flow of filtered air exhausted into the atmosphere.

6. The device as claimed in claim 3 wherein the air inlet includes movable baffle plates for altering the directed the flow of air drawn into the housing from the atmosphere.

7. The device as claimed in claim 1 wherein air exhausted from the housing to atmosphere is between 350 to 700 cubic feet per minute.

8. The device as claimed in claim 1 wherein the filter housing comprises a housing frame and housing panels lined with acoustical damping material.

9. The device as claimed in claim 6 wherein the damping material is sufficient to reduce the sound levels measured 5 feet from the housing to less than 60 decibels.

10. The device as claimed in claim 1 wherein the filter stacks are comprised of at least two of the cylindrical filter elements in coaxially stacked relation.

11. The device as claimed in claim 1 wherein said housing includes a frame having an opening closed by a removable panel, said removable panel carrying said air inlet.

12. The device as claimed in claim 11 wherein said removable panel has opposite ends and said air inlet is located adjacent one of said opposite ends so that selection of the position of said air inlet relative to said housing may be effected by selecting the orientation of said removable panel.

13. The device as claimed in claim 11 wherein said housing has a first and a second side with said air outlet located in said first side, said housing including a removable panel, said removable panel including said air inlet, said housing including an imperforate panel on said second side thereof, with said removable panel being of the same dimensions as said imperforate panel so that said panels are interchangeable between said first and second sides of said housing.

* * * * *